United States Patent [19]  [11] Patent Number: 4,814,547
Riley et al.  [45] Date of Patent: Mar. 21, 1989

[54] CABLE CONNECTOR

[75] Inventors: Leonard Riley, Mississauga; Lister Young, Weston, both of Canada

[73] Assignee: Cooper Industries, Inc., Houston, Tex.

[21] Appl. No.: 106,737

[22] Filed: Oct. 6, 1987

[51] Int. Cl.⁴ .......................................... H02G 15/007
[52] U.S. Cl. ................................................. 174/65 SS
[58] Field of Search ................... 174/65 SS; 285/158, 285/161

[56] References Cited

U.S. PATENT DOCUMENTS

| | | | |
|---|---|---|---|
| 3,352,961 | 11/1967 | Simon | 174/65 R |
| 3,567,843 | 3/1971 | Collins | 174/65 SS X |
| 4,513,172 | 4/1985 | Matsui | 174/65 SS |
| 4,549,755 | 10/1985 | Kot et al. | 174/65 SS |

Primary Examiner—Arthur T. Grimley
Assistant Examiner—David A. Tone
Attorney, Agent, or Firm—Nelson A. Blish; Eddie E. Scott; Alan R. Thiele

[57]  ABSTRACT

An electrical entry is provided to secure an armored electrical cable to an access port of an electrical enclosure. The cable entry has a body portion for securing to the enclosure, with a passage therethrough to receive the armored cable, and a plurality of chuck members each internally profiled to engage the corrugations of the metal armor. The outer surface portions of the chuck members are tapered to engage a radially inner tapered portion of the entry body, and a compression nut axially compresses the chuck members within the entry body into gripping relation with the cable armor to mechanically secure and electrically ground it; a seal is provided within the entry to prevent passage of moisture or liquid through the entry.

2 Claims, 2 Drawing Sheets

CABLE CONNECTOR

This invention is directed to a cable entry for securing an armored electrical cable in secure, sealed and grounded relation with an entry port of an electrical enclosure.

The attachment of armored cables to the entry ports of electrical enclosures is highly developed and well known.

In the prior electrical connector art it is known to make use of chuck type jaws within a tapered barrel for purposes of gripping the end of a conductor and securing it in mechanically attached relation to a grounding lug, as shown in U.S. Pat. No. 2,463,144 Buchanan, and includes also the use of a compression spring to provide grounded surface contact.

Also known is the use of an elastic O-ring encircling chuck type jaws, to facilitate their relative positioning and use.

However, the prior art usage does not teach the use of chuck type jaws in cooperation with an insulated cable, while maintaining intact the insulation and other protective components of the cable. In the case of prior art cable connection systems incorporating the introduction of weatherproofing compounds, such systems as are known are sensitive to orientation and unsuited to universal application, or to provide the functions required.

The present invention provides a cable entry for effecting mechanical connection of the cover of an armored cable to an entry port of an electrical enclosure. The subject cable entry comprises a hollow cylindrical body portion having a passage through it for receiving an armored cable. The front end of the entry body has a threaded nose portion for entry through a port in the wall of the enclosure. However, the entry body may have a nut mounted on it, within the enclosure, securing the body portion to the enclosure. The port of the enclosure may itself be threaded, to receive the body portions of the entry in threaded engagement therewith.

Chuck means, generally comprising a plurality of chuck members are located within the entry body, to substantially encircle the armored cover of the cable. The entry body has a forwardly tapered, radial, inner surface, against which matching tapered, radial, outer surfaces of the chuck members are contained.

Forward axial displacement of the chuck members within the entry body produces radial compressive displacement of the chuck members into gripping relation with the cable armor, under the action of the tapered inner surface of the entry body.

In a preferred embodiment of the present invention an outer surface portion of the front end of the entry body is threaded for attachment of the entry to a port of the enclosure. In addition, nut means, threadedly secured to the body portion in axial compressive relation with the chuck members, releasably secure the chuck members in gripping relation with the cable armored cover.

In a further embodiment the radially inner surfaces of the chuck members are provided with truncated thread portions to provide a mechanical and electrical grounding engagement between the cable metal armored cover, the electrically conductive chuck members, and the conductive body portion of the entry, which is thus grounded on installation to the wall of the electrical enclosure.

In a further embodiment the chuck members of the entry are each provided with a peripheral outer groove, within which is positioned a circumferential elastomeric biasing means such as an O-ring, which serves to retain the chuck members in assembled relation to each other when not in use. When in use, the circumferential biasing means keep the chuck members anchored in relation to the cable armor. The provision of an O-ring enhances the usefulness of the invention in the field as it enables the slip-on assembly of the chuck members and entry body to a cable. Work in close quarters and under adverse conditions is made easier, while also maintaining the organization of the entry components within their package.

In a further embodiment of the present invention an annular groove is provided in a radially inner portion of the entry body portion, adjacent the axially inner end of the entry body. In use, either during or after installation of a cable with the subject entry into an electrical enclosure, a daub of resilient sealant is applied, against the inner end of the entry fitting and the cable, to pack the inner end of the entry and surround with sealant the adjacent cable elements. The resilient sealant also penetrates the referred-to annular 10 groove, wherein the resilient sealant sets and cures, so as to permanently seal the inner end of the assembly against inward penetration of moisture and to provide resistance to pressure caused by explosive forces which may occur when the entry is used in hazardous locations. For disassembly, the elastomer can be separated at the locale where it is keyed into the annular groove, and the cable freed for withdrawal.

In the case of the inward taper of the mating surfaces of the chuck members and the corresponding body portion, the angle of taper lies in the range of about three and one half degrees to seven degrees, it being particularly noted that an angle of five and one half degrees facilitates ready assembly and secure tightening, without undue jamming of the components in assembled relation, and so making it easier to take apart the entry, for removal of the cable. As well, the extent of taper of the chuck members and the related tapered surface of the body portion confers a degree of flexibility to the entry, as it can be used for a variety of cable sizes.

In the preferred embodiment, within the outer end of the entry an annular washer is put between the outer compression nut means and the chuck members, to translate rotation of the nut means into axial displacement of the chuck members. In a further embodiment there is provided an elastomeric sealing washer within the outer nut means, serving to transmit axial compressive force from the compression nut to the chuck members while itself being radially deformed into sealing relation with the cable outer plastic sheath or cover.

In using the subject cable entry in cooperation with an electric cable having a protective outer plastic sheath, care is taken to strip the plastic sheath from the end of the metallic armor overlaid by the chuck members, so that effective electrical grounding contact is made between the armor and the chuck members. The chuck members in turn make grounding contact with the body of the entry, and thence, with the wall of the electrical enclosure to which it is mounted.

There is further provided a method of securing an armored electrical cable in mechanically secured, sealing relation with an entry port of an electrical enclosure, comprising the steps of; preparing one end of a subject cable to be connected through a pre-determined access port in an electrical enclosure, including removing a requisite length of the cable armor from the end selected; inserting a compression nut and ring of an attachment means axially over the armor of the cable in a forward, end-facing position; applying chuck means about the surface of a portion of the armor in axially located relation to align interior, annular, serration portions of the chuck means in axial engaging relation with outwardly protruding helical portions of the armor; securing a hollow cylindrical body to the entry port of the electrical enclosure; inserting the chuck means axially within the cylindrical body in axial engaging, radially constraining relation therewith, to secure the chuck means in engaged relation with the armor; engaging the compression nut in threaded relation with the cylindrical body and rotating the nut to axially compress the chuck means into radially constrained gripping relation with the armor thereby inserting the prepared cable end through the enclosure port in sealing relation to the enclosure, and applying a resilient seal in sealing relation between a portion of the cable and the attachment means during or after the insertion of the cable through the enclosure port, to substantially preclude the ingress of moisture and to provide resistance to explosive pressure.

The resilient seal can be applied by the insertion of a daub of resilient sealing compound to the inner end of the attachment means, so as to bridge the space between the cable inner plastic sheath and the inner end of the body portion of the attachment means, where an annular slot is provide into which the compound can penetrate and set.

Alternatively or in addition thereto, a resilient compressible annular sealing ring may be interposed internally of the attachment means for compression axially by the compression nut into radial and axial sealing engagement between the cable outer cover and the cable entry.

BRIEF DESCRIPTION OF THE DRAWINGS

Certain embodiments of the invention are described, reference being made to the accompanying drawings, wherein:

FIG. 3 is a transverse section taken at 3—3 of FIG. 1; and

DETAILED DESCRIPTION OF PREFERRED EMBODIMENT

Figure 1:
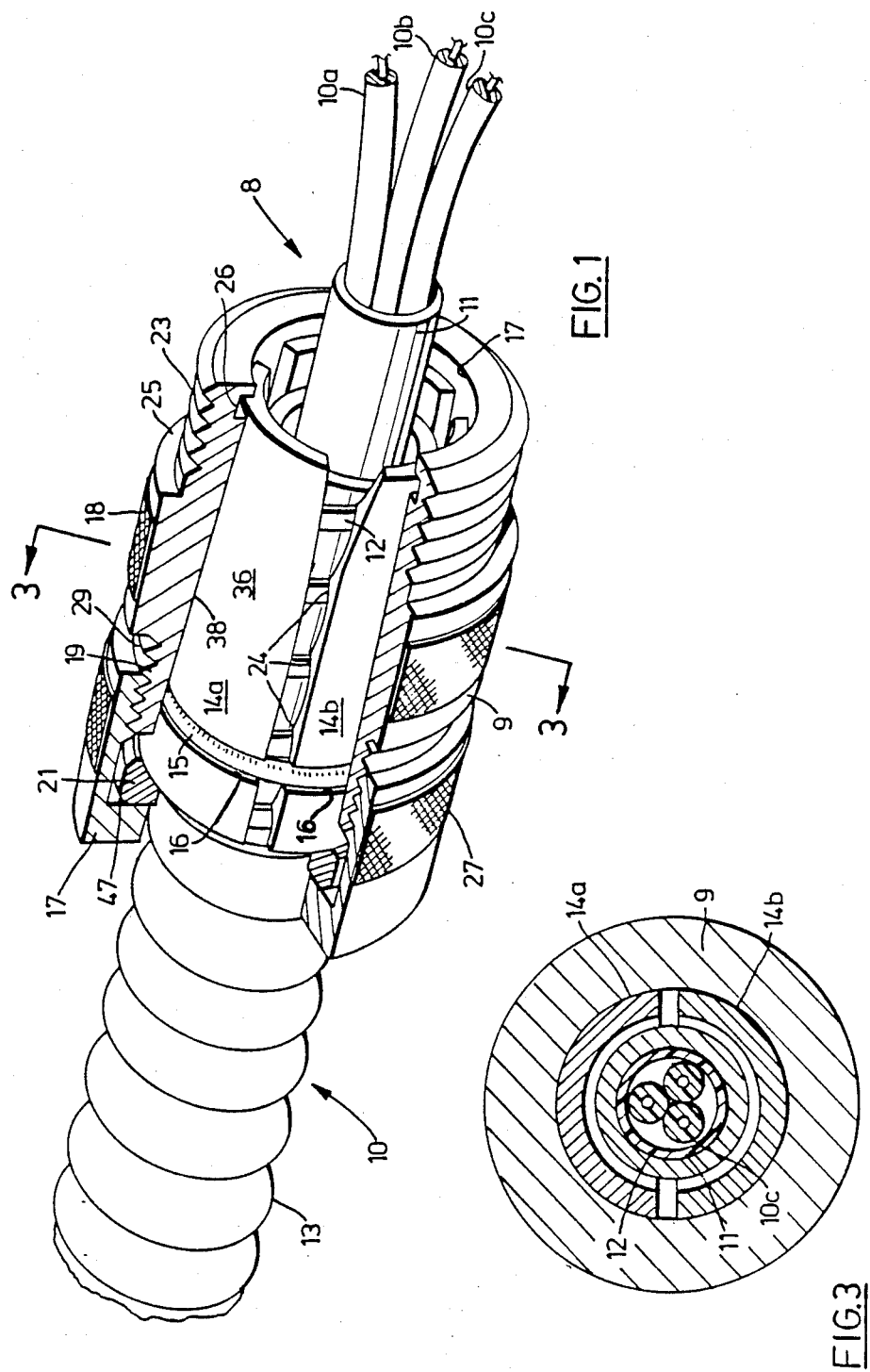
FIG. 1 is a general view, in part section, showing the subject cable entry in assembled relation with an armored cable.
Figure 2:
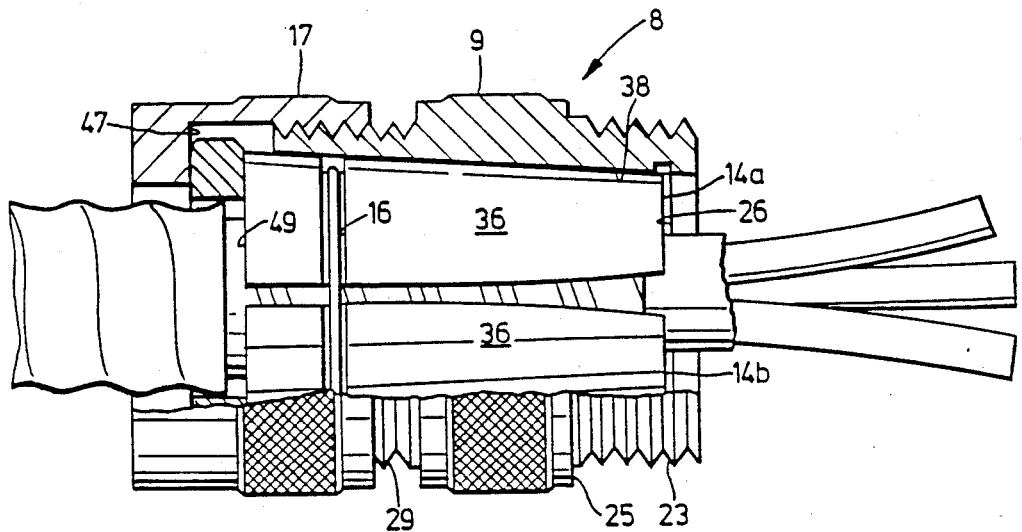
FIG. 2 is a side view, in partial diametrical section of the arrangement of FIG. 1.

Referring first to FIGS. 1 and 2, the entry assembly 8 has a hollow cylindrical body portion 9 with an armored and sheathed cable 10 extending therethrough. The cable 10 has a plurality of individually insulated conductors 10A, 10B, 10C within a plastic inner sheath 11. A pair of chuck members 14A, 14B are resiliently secured together by way of an elastomeric O-ring 15 positioned within annular groove portions 16 in chuck members 14A, 14B. The chuck members 14A, 14B each have annular serrations 24 positioned axially in gripping relation with respective helical turns of cable armor 12. The radially outer surface 36 of chuck members 14A, 14B are tapered axially at an angle in the range of about three and one half degrees to seven degrees, in correspondence with the angle of taper of the radially inner surface 38 of body portion 9.

An outer surface portion 18 of body portion 9 is knurled in order to provide a hand holdable gripping surface.

A compression nut 17 secured by threads 29 to the body portion 9 has a knurled outer surface 27 to facilitate tightening by hand.

The nut 17 has an inner annular shoulder 47 contacting metallic annular ring 21 in axial pressing relation. The ring, 21 bears against adjacent axial end faces 49 of the chuck members 14A, 14B, whereby hand tightening of compression nut 17 applies axial loading against chuck members 14A, 14B, with consequent radial inward displacement of chuck members 14A, 14B in gripping relation with the cable armor 12.

The outer plastic sheath 13 of cable 10 normally is terminated so as to extend within the entry assembly 8 but clear of the chuck members 14A, 14B so as not to interfere in the electrical contact between cable armor 12 and the chuck members 14A, 14B.

The nose of entry body portion 9 has a threaded portion 23 for entry within a port of an electrical enclosure, and a shoulder 25 to make sealing contact therewith. Just within the interior of the nose of body portion 9 an annular groove 26 is located.

In the assembled condition of FIGS. 1 and 2 a daub of resilient sealing compound is introduced so as to fill the groove, 26 and seal the frontal area within the body portion 9 to the inner sheath 11 and/or to the individual sheaths of conductors 10A, 10B and 10C. Upon curing of the seal material, withdrawal of the cable, subsequently, can be effected by severing the seal material across the mouth of the groove 26. The entry 8 can then be prepared for re-use by scraping away the remnants of the resilient seal material. The location of groove 26 adjacent the front of body 9 makes it easier to access for severance purposes, and to clean for purposes of re-use.

Referring to FIG. 3, the relative radial spacings of the related elements can be more readily viewed.

Figure 4:
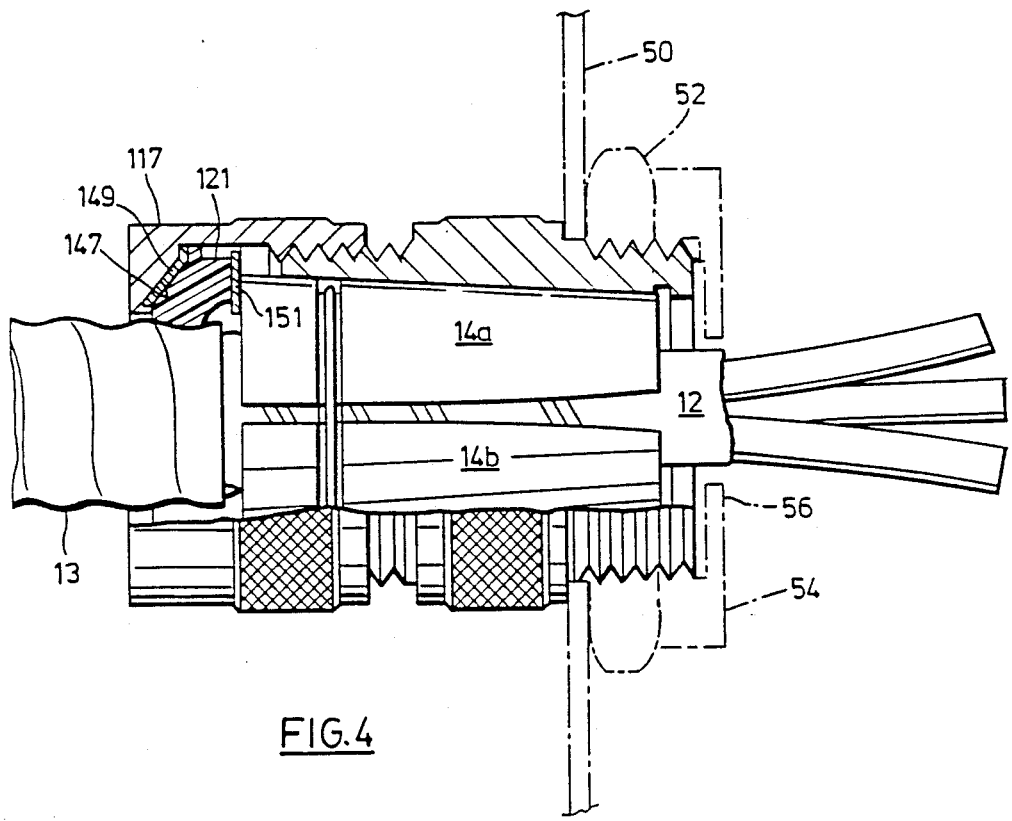
FIG. 4 is a view similar to FIG. 2 of a further embodiment in assembled relation with a wall of an electrical enclosure.

Turning to the FIG. 4 embodiment, an enclosure wall 50 of an electrical enclosure and retaining nut 52 are shown in phantom. Also shown is a lock nut 54 having an annular skirt portion 56 projecting radially inwardly to contain the resilient seal.

A compression nut 117 has a conical inner shoulder portion 147 a washer 149 a thrust washer 151 and an elastomeric annular seal or ring 121 in sandwiched relation therebetween.

In addition to axially compressing the chuck members 14A, 4B into radial gripping relation with the cable armor 12 the nut 117 compresses the elastomeric seal 121 into radially compressive sealing relation with the outer plastic sheath 13 of cable 10.

We claim:

1. A cable entry for mechanically securing an electrical cable in attached sealing relation to an electrical enclosure, the entry comprising.

a cylindrical body portion having an axial bore therethrough;

securing means located at a forward end of the body portion for securement of the body portion to the electrical enclosure;

expansible chuck means to receive an armor portion of said cable in inserted relation therein, said chuck means being radially compressible, in use, into gripping relation with the cable armor portion;

a tapered radially outer portion of the chuck means making contact with a radially inner tapered portion of the body portion;

compression nut means threadedly attached to the body portion in axial compressive relation with the chuck means, to radially compress the chuck means into gripping relating with the cable armor, recess means to receive in use an resilient seal in sealing engagement between the electrical cable and the cable entry; and annular nut means threadedly secured to said forward end threaded surface having an inwardly extending annular skirt portion, in use to retain sealant inserted within said forward body portion.

2. The method of securing an armored electrical cable in mechanically secured, sealing relation with an entry port of an electrical enclosure, comprising the steps of:

preparing one end of a cable to be connected through a predetermined access port to within an electrical enclosure, including removing a requisite length of the armour thereof from the selected end of the cable;

inserting a compression nut and ring of an attachment means axially over the armor of the cable in an outward facing position;

applying chuck means about the surface of a portion of the armor in axially located relation to align annular serration portions of the chuck means in axially engaging relation with outwardly protruding helix portions of the armor;

securing a hollow cylindrical body to the entry port of the electrical enclosure;

inserting chuck means axially within the cylindrical body in axial engaged, radially constricted relation therewith, to secure the chuck means in engaged relation with the armor;

engaging the compression nut in threaded relation with the cylindrical body and rotating the nut to axially compress the chuck means into radially constrained gripping relation with the armor thereby securing the prepared cable end in inserted relation through the enclosure port; and applying a resilient sealant in sealing relation between a portion of the cable and the attachment means, said resilient seal applied as a sealing coating within the enclosure in inserted engaging relation, to enter and set within at least one recess of the attachment means in sealing and axial restrained relation therewith.

* * * * *